United States Patent
Chen

(10) Patent No.: US 10,999,803 B2
(45) Date of Patent: May 4, 2021

(54) SIGNAL TRANSMISSION METHOD AND TERMINAL DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/619,717

(22) PCT Filed: Aug. 16, 2017

(86) PCT No.: PCT/CN2017/097673
§ 371 (c)(1),
(2) Date: Dec. 5, 2019

(87) PCT Pub. No.: WO2019/033302
PCT Pub. Date: Feb. 21, 2019

(65) Prior Publication Data
US 2020/0205084 A1 Jun. 25, 2020

(51) Int. Cl.
H04W 52/14 (2009.01)
H04W 52/36 (2009.01)
H04W 52/00 (2009.01)
H04W 52/10 (2009.01)
H04W 52/16 (2009.01)
(Continued)

(52) U.S. Cl.
CPC ......... *H04W 52/146* (2013.01); *H04W 52/00* (2013.01); *H04W 52/10* (2013.01); *H04W 52/16* (2013.01); *H04W 52/281* (2013.01); *H04W 52/367* (2013.01); *H04W 72/0473* (2013.01);
(Continued)

(58) Field of Classification Search
CPC . H04W 52/146; H04W 52/367; H04W 52/10; H04W 52/00; H04W 52/16; H04W 52/281; H04W 72/0473; H04W 72/1242; H04W 72/1268
See application file for complete search history.

(56) References Cited

U.S. PATENT DOCUMENTS 9,030,980 B2 5/2015 Kim et al.
9,332,503 B2 5/2016 Ma et al.
(Continued)

FOREIGN PATENT DOCUMENTS

CN 101998596 3/2011
CN 103369647 10/2013
(Continued)

OTHER PUBLICATIONS

ZTE et al., "UL MIMO power control," 3GPP TSG RAN WG1 Meeting #89, R1-1707137, May 2017, 3 pages.
(Continued)

*Primary Examiner* — Dominic E Rego
(74) *Attorney, Agent, or Firm* — Hodgson Russ LLP

(57) ABSTRACT

A signal transmission method includes: determining, by the terminal device, an effective transmission power of a plurality of uplink signals; and transmitting, by the terminal device, the plurality of uplink signals simultaneously in a same frequency domain resource set according to the effective transmission power of the plurality of uplink signals.

12 Claims, 2 Drawing Sheets

(51) Int. Cl.
*H04W 52/28* (2009.01)
*H04W 72/04* (2009.01)
*H04W 72/12* (2009.01)

(52) U.S. Cl.
CPC ... *H04W 72/1242* (2013.01); *H04W 72/1268* (2013.01)

(56) References Cited

U.S. PATENT DOCUMENTS

| | | | |
|---|---|---|---|
| 2011/0243007 A1 | 10/2011 | Xiao | |
| 2012/0099527 A1* | 4/2012 | Ishii | H04W 72/048 370/328 |
| 2012/0115537 A1* | 5/2012 | Gaal | H04W 52/146 455/522 |
| 2012/0224552 A1* | 9/2012 | Feuersanger | H04L 5/006 370/329 |
| 2014/0146777 A1 | 5/2014 | Shin et al. | |
| 2014/0161093 A1* | 6/2014 | Hoshino | H04B 7/024 370/329 |
| 2014/0219203 A1* | 8/2014 | Lin | H04W 52/34 370/329 |
| 2014/0329555 A1* | 11/2014 | Gao | H04W 52/367 455/522 |
| 2015/0055454 A1 | 2/2015 | Yang et al. | |
| 2015/0063245 A1* | 3/2015 | Gao | H04W 52/346 370/329 |
| 2015/0264676 A1* | 9/2015 | Suzuki | H04L 5/0053 370/329 |
| 2015/0319703 A1* | 11/2015 | Kwon | H04W 52/281 370/329 |
| 2015/0358915 A1* | 12/2015 | Semaan | H04W 52/367 370/329 |
| 2016/0007323 A1* | 1/2016 | Suzuki | H04L 5/0053 370/329 |
| 2016/0095069 A1* | 3/2016 | Noh | H04L 1/1671 455/452.1 |
| 2016/0157184 A1* | 6/2016 | Wang | H04L 5/0055 370/329 |
| 2016/0165547 A1* | 6/2016 | Ouchi | H04W 52/146 455/522 |
| 2016/0301515 A1* | 10/2016 | Ouchi | H04W 72/1226 |
| 2016/0353440 A1* | 12/2016 | Lee | H04W 72/0453 |
| 2017/0013565 A1 | 1/2017 | Pelletier et al. | |
| 2017/0086149 A1* | 3/2017 | Takeda | H04W 52/365 |
| 2017/0111873 A1 | 4/2017 | Kakishima et al. | |
| 2017/0238268 A1* | 8/2017 | Yang | H04W 72/0413 370/329 |
| 2017/0295046 A1* | 10/2017 | Ahn | H04W 52/146 |
| 2017/0325175 A1* | 11/2017 | Dinan | H04W 72/1205 |

FOREIGN PATENT DOCUMENTS

| | | |
|---|---|---|
| CN | 103369657 | 10/2013 |
| EP | 2819473 | 10/2016 |
| RU | 2430469 | 9/2011 |
| RU | 2627299 | 8/2017 |
| WO | 2013115714 | 8/2013 |

OTHER PUBLICATIONS

WIPO, ISR for PCT/CN2017/097673, Apr. 27, 2018.
"3rd Generation Partnership Project; Technical Specification Group Radio Access Network; Evolved Universal Terrestrial Radio Access (E-UTRA); Physical layer procedures (Release 11)," 3GPP TS 36.213, v11.0.0, Sep. 2012, 143 pages.
NTT DOCOMO, "SRS handling and its power-control," 3GPP TSG RAN WG1 Meeting #78bis, R1-144143, Oct. 2014, 4 pages.
EPO, Office Action for EP Application No. 17921769.0, dated Apr. 29, 2020.
FSIP, Office Action for RU Application No. 2019143096/07, dated Sep. 3, 2020.
ISDEC, Office Action for CA Application No. 3065411, dated Feb. 1, 2021.
EPO, Communication for EP Application No. 17921769.0, dated Jan. 22, 2021.
IPI, Office Action for IN Application No. 201917051226, dated Mar. 18, 2021.

* cited by examiner

SIGNAL TRANSMISSION METHOD AND TERMINAL DEVICE

CROSS-REFERENCE TO RELATED APPLICATION

This application is a U.S. national phase application of International Application No. PCT/CN2017/097673, filed Aug. 16, 2017, the entire disclosure of which is incorporated herein by reference.

TECHNICAL FIELD

Embodiments of the present disclosure relate to the field of communication, and more particularly, to a signal transmission method and a terminal device.

BACKGROUND

In the 5G New Radio (NR) system, an antenna array of a terminal device may include a plurality of antenna panels, which may be used for transmitting uplink signals at the same time. Herein, one antenna panel may include multiple antenna units, and different antenna panels may use different Radio Frequency (RF) channels. When the terminal device is scheduled to transmit data on multiple antenna panels simultaneously in the same carrier, if a transmission power of the terminal device is limited, how to enable the terminal device to transmit data on the plurality of antenna panels becomes an urgent problem to be solved.

SUMMARY

The embodiments of the disclosure provides a signal transmission method and a terminal device. When the transmission power is limited, the terminal device can still simultaneously transmit multiple uplink signal within a same frequency domain set.

According to a first aspect, there is provided a signal transmission method, including: determining, by the terminal device, an effective transmission power of a plurality of uplink signals; and transmitting, by the terminal device, the plurality of uplink signals simultaneously in a same frequency domain resource set according to the effective transmission power of the plurality of uplink signals.

Therefore, the terminal device determines, according to a certain manner of power distribution, the effective transmission power respectively for the plurality of uplink signals to be transmitted simultaneously in the same frequency domain resource set and, thus, transmit the plurality of uplink signals simultaneously in the same frequency domain resource set according to the effective transmission power of the plurality of uplink signals. In this way, even if a transmission power of the terminal device is limited, the terminal device may be still able to re-determine, according to the manner of power distribution described in embodiments of the disclosure, the effective transmission power respectively for the plurality of uplink signals to be transmitted and, thus, transmit the plurality of uplink signals simultaneously in the same frequency domain resource.

In a possible implementation, the plurality of uplink signals include uplink data or an uplink reference signal.

In a possible implementation, the plurality of uplink signals are uplink signals scheduled by same downlink control information (DCI), or uplink signals respectively scheduled by different DCIs.

In a possible implementation, the same frequency domain resource set includes: a same carrier, a same bandwidth part, a same sub-band, or a same set of physical resource block (PRB).

In a possible implementation, the determining, by the terminal device, an effective transmission power of a plurality of uplink signals includes: determining, by the terminal device, the effective transmission power of the plurality of uplink signals according to a number of the plurality of uplink signals.

In a possible implementation, the determining, by the terminal device, the effective transmission power of the plurality of uplink signals according to a number of the plurality of uplink signals includes: determining, by the terminal device, a maximum supported transmission power of each uplink signal among the plurality of uplink signals according to the number of the plurality of uplink signals; and determining, by the terminal device, the effective transmission power of the each uplink signal based on the maximum supported transmission power of the each uplink signal.

For example, assuming that the number of the plurality of uplink signals to be transmitted is N and a maximum transmission power supported by the terminal device is $P_{max}$, the terminal device may determine, according to the maximum transmission power supported by the terminal device $P_{max}$ and the number of the plurality of uplink signals N, the maximum supported transmission power of each uplink signal is $P_{max}/N$. Then, the terminal device may determine, through a conventional procedure of uplink power control, the effective transmission power of the each uplink signal based on the maximum supported transmission power of the each uplink signal.

In a possible implementation, the determining, by the terminal device, the effective transmission power of the plurality of uplink signals according to a number of the plurality of uplink signals includes: determining, by the terminal device, an expected transmission power of the each uplink signal among the plurality of uplink signals being reduced based on a ratio corresponding to the number of the plurality of uplink signals, as the effective transmission power of the each uplink signal.

For example, assuming that the expected transmission power of the each uplink signal among the plurality of uplink signals is $P_i$, where $0 < i \leq N$, N is the number of the plurality of uplink signals, and each value of N corresponds to a ratio. If the number N corresponds to a ratio of $1/N$, the expected transmission power of the each uplink signal may be reduced to $P_i/N$. The procedure for reducing the expected transmission power may be performed, for example, when a power consumption of the terminal device needs to be reduced, or only when a sum of the expected transmission powers of the plurality of uplink signals exceeds the maximum transmission power supported by the terminal device.

In a possible implementation, the determining, by the terminal device, an effective transmission power of a plurality of uplink signals includes: determining, by the terminal device, the effective transmission power of the plurality of uplink signals according to priority information of the plurality of uplink signals.

In a possible implementation, before the determining, by the terminal device, the effective transmission power of the plurality of uplink signals according to priority information of the plurality of uplink signals, the method further includes: determining, by the terminal device, the priority information of the plurality of uplink signals according to at least one of following information: a signal type of the plurality of uplink signals, a control signaling used for scheduling the plurality of uplink signals, a type of information carried by the plurality of uplink signals, and an order by which the plurality of uplink signals are scheduled.

In a possible implementation, the determining, by the terminal device, the priority information of the plurality of uplink signals according to the control signaling used for scheduling the plurality of uplink signals includes: receiving, by the terminal device, a plurality of DCIs used for scheduling the plurality of uplink signals, the plurality of DCIs carrying the priority information of the plurality of uplink signals; or receiving, by the terminal device, the plurality of DCIs, and determining the priority information of the plurality of uplink signals according to information of modulation coding scheme (MCS) carried in the plurality of DCIs.

In a possible implementation, the determining, by the terminal device, the effective transmission power of the plurality of uplink signals according to priority information of the plurality of uplink signals includes: allocating, by the terminal device, respective minimum transmission powers for the plurality of uplink signals; and allocating, by the terminal device according to the priority information of the plurality of uplink signals, remaining transmission power in a maximum supportable transmission power excluding the minimum transmission powers of the plurality of uplink signals to at least part of the plurality of uplink signals.

For example, assuming that the number of the plurality of uplink signals to be transmitted is N, the minimum transmission power of each uplink signal is $P_{min}$, the maximum transmission power of the i-th uplink signal among the N uplink signals is $P_{i-max}$, the maximum transmission power supported by the terminal device is $P_{max}$, then the remaining transmission power is $P_r = P_{max} - N \times P_{min}$. Firstly, the terminal device allocates respective minimum transmission powers $P_{min}$ for each uplink signal. Then, the terminal device allocates the remaining transmission power $P_r$ according to a priority order of the uplink signals. Assuming N=3, that is, the number of the plurality of uplink signals is 3, including signal 1, signal 2 and signal 3, when the allocation of remaining power is not performed, the signals 1, 2 and 3 are allocated with $P_{min}$. Subsequently, the terminal device may acquire the priority information of those three signals by forgoing process, assuming the priority from high to low is signal 1>signal 2>signal 3, then the terminal device allocates remaining transmission power $P_r$ firstly to signal 1 with the highest priority, for example, causing the transmission $P_{min}$ thereof to reach its maximum transmission power $P_{1-max}$; if there is still surplus of the remaining transmission power $P_r$, then the terminal device proceeds with allocation of transmission power for signal 2; if there is still surplus of the remaining transmission power $P_r$ after the transmission power $P_{min}$ of signal 2 reaches its maximum transmission power $P_{2-max}$, then the terminal device proceeds with allocation of transmission power for signal 3. When the remaining transmission power is consumed out during the process of allocation and not enough for continuous allocation, the operation may be stopped. The effective transmission power of the signal which is the last one to be allocated with transmission power may not be able to reach its maximum transmission power.

In a possible implementation, the priority information of the plurality of uplink signals is configured by a network device in advance for the plurality of uplink signals.

In a possible implementation, the determining, by the terminal device, an effective transmission power of a plurality of uplink signals includes: determining by the terminal device, if a sum of expected transmission powers of the plurality of uplink signals exceeds a maximum transmission power supported by the terminal device, the expected transmission power of each uplink signal among the plurality of uplink signals being reduced based on a ratio of the maximum transmission power to the sum of expected transmission powers of the plurality of uplink signals, as the effective transmission power of the each uplink signal.

For example, assuming that the maximum transmission power supported by the terminal device is $P_{max}$, the number of the plurality of uplink signals to be transmitted is N, and the expected transmission power of the i-th uplink signal among the plurality of uplink signals, which is derived according to a conventional procedure of uplink power control, is $P_i$, then the sum of expected transmission powers of the plurality of uplink signals is $P_a = \Sigma_{i=1}^{N} P_i$, and the terminal device may reduce the effective transmission power of the i-th uplink signal to $P_i \times (P_{max}/P_a)$.

In a possible implementation, the determining, by the terminal device, an effective transmission power of a plurality of uplink signals includes: receiving, by the terminal device, indication information sent by a network device, the indication information indicating a power control parameter corresponding to the plurality of uplink signals; and determining, by the terminal device, the effective transmission power of the plurality of uplink signals according to the power control parameter corresponding to the plurality of uplink signals.

In a possible implementation, the transmitting, by the terminal device, the plurality of uplink signals simultaneously in a same frequency domain resource set according to the effective transmission power of the plurality of uplink signals includes: transmitting, by the terminal device, the plurality of uplink signals simultaneously on different frequency domain resource in the same frequency domain resource set according to the effective transmission power of the plurality of uplink signals.

In a possible implementation, the transmitting, by the terminal device, the plurality of uplink signals simultaneously in a same frequency domain resource set according to the effective transmission power of the plurality of uplink signals includes: transmitting, by the terminal device, the plurality of uplink signals simultaneously in the same frequency domain resource set through different antenna panels according to the effective transmission power of the plurality of uplink signals.

In a possible implementation, the transmitting, by the terminal device, the plurality of uplink signals simultaneously in a same frequency domain resource set according to the effective transmission power of the plurality of uplink signals includes: transmitting, by the terminal device, the plurality of uplink signals simultaneously in the same frequency domain resource set through different beams according to the effective transmission power of the plurality of uplink signals.

According to a second aspect, there is provided a terminal device configured to perform the operations of terminal device as described in the first aspect or any possible implementation thereof. Specifically, the terminal device may include any module units configured to perform the operations of terminal device as described in the first aspect or any possible implementation thereof.

According to a third aspect, there is provided a terminal device, including a processor, a transceiver and a memory. The processor, the transceiver, and the memory communicate with each other through an internal connection path. The memory is configured to store instructions, and the processor is configured to execute instructions stored by the memory. When the processor executes the instructions stored by the memory, the execution causes the terminal device to perform the method as described in the first aspect or any possible implementation thereof, or causes the terminal device to be implemented as the terminal device provided by the third aspect.

According to a fourth aspect, there is provided a computer-readable storage medium configured to store a program, the program causes the terminal device to perform the signal transmission method as described in the first aspect or any possible implementation thereof.

According to a fifth aspect, there is provided a system chip, including: an input interface, an output interface, a processor, and a memory. The processor is configured to execute instructions stored in the memory. When the instructions are executed, the processor is able to implement the method as described in the first aspect or any possible implementation thereof.

According to a sixth aspect, there is provided a computer program product including instructions which, when run on a computer, causes the computer to perform the method as described in the first aspect or any possible implementation thereof.

DETAILED DESCRIPTION

Technical solutions in the embodiments of the present disclosure will be described below with reference to the accompanying drawings.

It is to be understood that the technical solutions in the embodiments of the present disclosure may be applied to various communication systems, for example, a Global System of Mobile communication (GSM), a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, a Universal Mobile Telecommunication System (UMTS), future 5G communication system and the like.

The embodiments of the present disclosure are described with reference to a terminal device. The terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device, or another processing device connected to a wireless modem, a vehicle-mounted device, a wearable device, a terminal device in future 5G network, a terminal device in future evolved Public Land Mobile Network (PLMN) network and the like.

The embodiments of the present disclosure are described with reference to a network device. The network device may be a device used for communicating with the terminal device, for example, may be a Base Transceiver Station (BTS) in the GSM system or CDMA, or may be a NodeB (NB) in the WCDMA system, or may be an Evolutional Node B (eNB or eNodeB) in the LTE system. Optionally, the network device may be a relay station, an access point, an in-vehicle device, a wearable device, a network side device in the future 5G network, network side device in the future evolved PLMN network, and the like.

Figure 1:
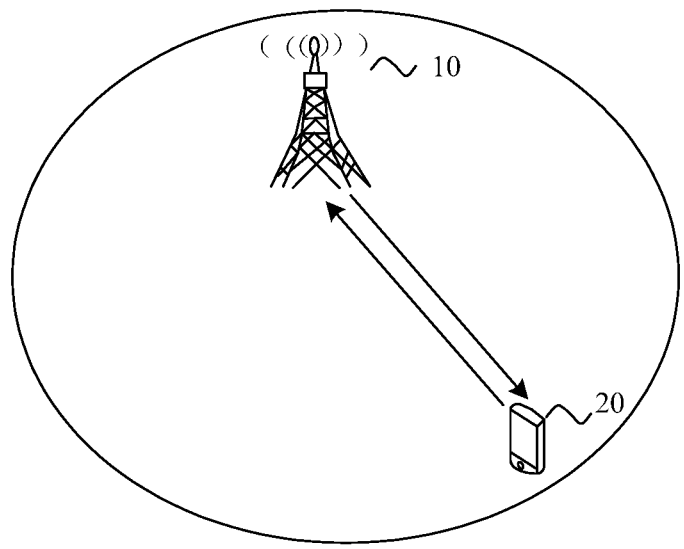
FIG. 1 is a schematic structural diagram illustrating an application scenario according to an embodiment of the disclosure.

FIG. 1 is a schematic structural diagram illustrating an application scenario according to an embodiment of the disclosure. The communication system in FIG. 1 may include a network device 10 and a terminal device 20. The network device 10 is configured to provide communication services for the terminal device 20 and access the core network. The terminal device 20 may access the network by searching for synchronization signals, broadcast signals, and the like transmitted by the network device 10, thereby performing communication with the network. The arrows shown in FIG. 1 may represent uplink/downlink transmissions performed via a cellular link between the terminal device 20 and the network device 10.

The network in the embodiment of the disclosure may refer to a Public Land Mobile Network (PLMN), a Device to Device (D2D) network, a Machine to Machine/Man (M2M) network, or the like, FIG. 1 is only a simplified schematic diagram of an example, and other terminal devices may also be included in the network, which are not shown in FIG. 1.

Figure 2:
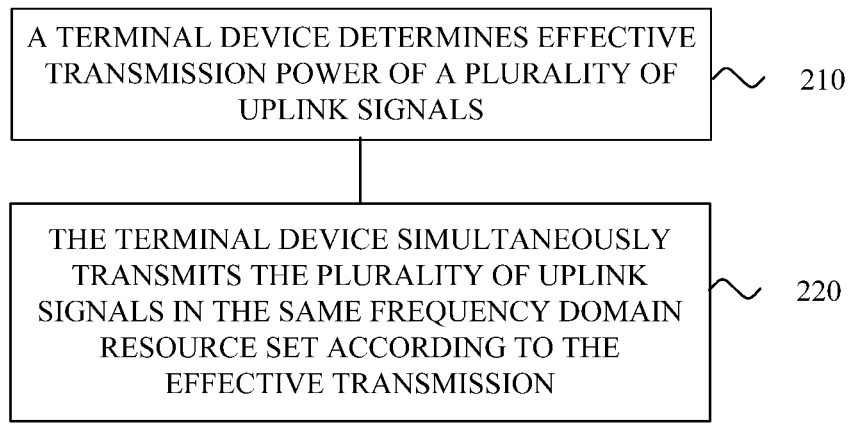
FIG. 2 is a flow chart illustrating a signal transmission method according to an embodiment of the disclosure.

FIG. 2 is a flow chart illustrating a signal transmission method according to an embodiment of the disclosure. The method illustrated in FIG. 2 may be performed by a terminal device, for example, the terminal device 20 as shown in FIG. 1. As shown in FIG. 2, the signal transmission method includes following steps.

In step 210, the terminal device determines an effective transmission power of a plurality of uplink signals.

In step 220, the terminal device transmits the plurality of uplink signals simultaneously in a same frequency domain resource set according to the effective transmission power of the plurality of uplink signals.

Specifically, the terminal device determines respective effective transmission powers for the plurality of uplink signals, so that, through reasonable distribution of transmission power, the terminal device can transmit the plurality of uplink signals simultaneously in the same frequency domain resource set according to the effective transmission power of the plurality of uplink signals.

When the terminal device sends only one uplink signal, the uplink signal may be subjected to, for example, open-loop power control or closed-loop power control by using related parameters, and a transmission power can be determined for the uplink information, such transmission power may be referred to as the expected transmission power in embodiments of the disclosure. In other words, the expected transmission power of an uplink signal may be determined by existing means. According to embodiments of the disclosure, however, the plurality of uplink signals are to be simultaneously transmitted. Therefore, when the terminal device is scheduled to transmit the plurality of uplink signals simultaneously in the same frequency domain resource set, if those uplink signals are still transmitted simultaneously according to the expected transmission power of each uplink signal, the transmission power of the terminal device may be limited. Therefore, embodiments of the disclosure provide following manners to re-determine the effective transmission power of each uplink signal for the each uplink signal, so that the terminal device can transmit the plurality of uplink signals simultaneously in the same frequency domain resource set according to the effective transmission power of the plurality of uplink signals.

Optionally, the plurality of uplink signals include uplink data or an uplink reference signal.

For example, the plurality of uplink signals may be a plurality of Physical Uplink Shared Channels (PUSCHs), or may be different transport layers within one PUSCH, or may be different codewords within one PUSCH. Optionally, the plurality of uplink signals may be a plurality of Sounding Reference Signals (SRSs).

Optionally, the plurality of uplink signals are uplink signals scheduled by same downlink control information (DCI), or uplink signals respectively scheduled by different DCIs.

For example, the uplink signals may be a plurality of PUSCHs scheduled by the same DCI, or a plurality of aperiodic SRSs triggered by the same DCI, or a plurality of independent PUSCHs respectively scheduled by a plurality of DCIs, or a plurality of independent aperiodic SRSs respectively triggered by a plurality of DCIs.

Optionally, the same frequency domain resource set includes: a same carrier, a same bandwidth part, a same sub-band, or a same set of physical resource block (PRB).

In other words, the frequency domain resource set may be one carrier, one bandwidth part, one sub-band, or one PRB set.

Four implementation manners are provided by embodiments of the disclosure to determine the effective transmission power of the plurality of uplink signals and will be described in details as follows.

Implementation Manner 1

Optionally, in step 210, the terminal device determines the effective transmission power of a plurality of uplink signals includes: determining, by the terminal device, the effective transmission power of the plurality of uplink signals according to a number of the plurality of uplink signals.

Further, the terminal device may specifically determine the effective transmission power of the plurality of uplink signals according to the number of the plurality of uplink signals in the following two manners. In the first manner, the terminal device directly determines a maximum supported transmission power for each of the plurality of uplink signals according to the number of the plurality of uplink signals, and determines the effective manners power for each uplink signal based on the maximum supported transmission power. In the other manner, the terminal device obtains a ratio according to the number of the plurality of uplink signals, and reduces the expected transmission power of each uplink signal according to the ratio, thereby obtaining the effective transmission power of each uplink signal. Details will be described below.

Optionally, the determining, by the terminal device, the effective transmission power of the plurality of uplink signals according to a number of the plurality of uplink signals includes: determining, by the terminal device, a maximum supported transmission power of each uplink signal among the plurality of uplink signals according to the number of the plurality of uplink signals; and determining, by the terminal device, the effective transmission power of the each uplink signal based on the maximum supported transmission power of the each uplink signal.

For example, assuming that the number of the plurality of uplink signals to be transmitted is N and a maximum transmission power supported by the terminal device is $P_{max}$, the terminal device may determine, according to the maximum transmission power supported by the terminal device $P_{max}$ and the number of the plurality of uplink signals N, the maximum supported transmission power of each uplink signal is $P_{max}/N$. Then, the terminal device may determine, through a conventional procedure of uplink power control, the effective transmission power of the each uplink signal based on the maximum supported transmission power of the each uplink signal.

Each uplink signal has its own maximum supported transmission power, and the effective transmission power used for transmitting the uplink signal does not exceed the maximum supported transmission power corresponding to the uplink signal. Different from the respective maximum supported transmission power of each uplink signal, the maximum transmission power supported by the terminal device is a whole transmission power that the terminal device can provide for one transmission.

Optionally, the determining, by the terminal device, effective transmission power of the plurality of uplink signals according to a number of the plurality of uplink signals includes: determining, by the terminal device, an expected transmission power of the each uplink signal among the plurality of uplink signals being reduced based on a ratio corresponding to the number of the plurality of uplink signals, as the effective transmission power of the each uplink signal.

For example, assuming that the expected transmission power of the each uplink signal among the plurality of uplink signals is $P_i$, where $0<i\le N$, N is the number of the plurality of uplink signals, and each value of N corresponds to a ratio. If the number N corresponds to a ratio of 1/N, the expected transmission power of the each uplink signal may be reduced to $P_i/N$. If the number N corresponds to a ratio of 1/2N, the expected transmission power of the each uplink signal may be reduced to $P_i/2N$. The procedure for reducing the expected transmission power may be performed, for example, when a power consumption of the terminal device needs to be reduced, or only when a sum of the expected transmission powers of the plurality of uplink signals exceeds the maximum transmission power supported by the terminal device.

Implementation Manner 2

Optionally, in step 210, the terminal device determines the effective transmission power of a plurality of uplink signals includes: determining, by the terminal device, the effective transmission power of the plurality of uplink signals according to priority information of the plurality of uplink signals.

The priority information of the plurality of uplink signals may be, for example, configured by a network device in advance for the plurality of uplink signals.

Optionally, before the determining, by the terminal device, the effective transmission power of the plurality of uplink signals according to priority information of the plurality of uplink signals, the method may further include: determining, by the terminal device, the priority information of the plurality of uplink signals according to at least one of following information:

a signal type of the plurality of uplink signals, a control signaling used for scheduling the plurality of uplink signals, a type of information carried by the plurality of uplink signals, and an order by which the plurality of uplink signals are scheduled.

For example, when the terminal device determines the priority information of the plurality of uplink signals according to the control signaling used for scheduling the plurality of uplink signals, the terminal device may acquire the priority information of multiple uplink information by receiving a plurality of DCIs used for scheduling the plurality of uplink signals, where the plurality of DCIs carry the priority information of the plurality of uplink signals. Optionally, or terminal device may receive the plurality of DCIs used for scheduling the plurality of uplink signals, and determine the priority information of the plurality of uplink signals according to information of Modulation Coding Mode (MCS) carried in the plurality of DCIs. For example, the network device may independently indicate an MCS level of each uplink signal for the plurality of uplink signals through one or more DCIs, the higher the MCS level of the uplink signal, the higher the priority thereof.

For another example, the terminal device may determine the priority information of the plurality of uplink signals according to the type of information carried by the plurality of uplink signals based on the following rules. A physical uplink control channel (PUCCH) has a higher priority than any of PUSCH, SRS, and Phase Tracking Reference Signal (PTRS), PTRS has a higher priority than SRS, PUSCH has a higher priority than SRS, and PUCCH carrying information of Acknowledgement (ACK)/Negative Acknowledgement (NACK) has a higher priority than PUCCH carrying Channel State Information (CSI).

PUSCH carrying Uplink Control Information (UCI) has a higher priority than PUSCH without carrying UCI. Optionally, PUSCH carrying Ultra Reliable Low Latency Communication (URLLC) data has a higher priority than PUSCH carrying Enhanced Mobile Broadband (eMBB) data.

For another example, when the terminal device determines the priority information of the plurality of uplink signals according to the order by which the plurality of uplink signals are scheduled, if the plurality of uplink signals are respectively scheduled by a plurality of DCIs, the uplink signal scheduled by a DCI firstly received by the terminal device has a higher priority than that scheduled by a DCI subsequently received by the terminal device. Optionally, the uplink signal scheduled by a DCI subsequently received by the terminal device has a higher priority than that scheduled by a DCI firstly received by the terminal device.

Moreover, after acquiring the priority information of the plurality of uplink signals, the terminal device may determine the effective transmission power of the plurality of uplink signals according to the priority information of the plurality of uplink signals through following ways.

Optionally, the determining, by the terminal device, the effective transmission power of the plurality of uplink signals according to priority information of the plurality of uplink signals includes: allocating, by the terminal device, respective minimum transmission powers for the plurality of uplink signals; and allocating, by the terminal device according to the priority information of the plurality of uplink signals, remaining transmission power in a maximum supportable transmission power excluding the minimum transmission powers of the plurality of uplink signals to at least part of the plurality of uplink signals.

Specifically, the terminal device may temporarily allocate the respective minimum transmission power (also may be referred to as minimum supported transmission power) for the plurality of uplink signals. Then, the terminal device subtracts the minimum supported transmission power of the plurality of uplink signals from the maximum supported transmission power, and allocates the remaining transmission power. When allocating the remaining transmission power, it is performed according to the priority information of the plurality of uplink signals. The terminal device sequentially allocates the remaining transmission powers in descending order of priority. Among the plurality of uplink signals, at least part of the uplink signals with higher priority may be additionally allocated with transmission power, so that the at least part of the uplink signals may be powered up again based on being allocated with the minimum supported transmission power, for example, reach their respective maximum supported transmission power, or reach a certain percentage of their respective maximum supported transmission power.

For example, assuming that the number of the plurality of uplink signals to be transmitted is N, the minimum transmission power of each uplink signal is $P_{min}$, the maximum transmission power of the i-th uplink signal among the N uplink signals is $P_{i\text{-}max}$, the maximum transmission power supported by the terminal device is $P_{max}$, then the remaining transmission power is $P_r=P_{max}-N\times P_{min}$. Firstly, the terminal device allocates respective minimum transmission powers $P_{min}$ for each uplink signal. Then, the terminal device allocates the remaining transmission power $P_r$ according to a priority order of the uplink signals. Assuming N=3, that is, the number of the plurality of uplink signals is 3, including signal 1, signal 2 and signal 3, when the allocation of remaining power is not performed, the signals 1, 2 and 3 are allocated with $P_{min}$. Subsequently, the terminal device may acquire the priority information of those three signals by forgoing process, assuming the priority from high to low is signal 1>signal 2>signal 3, then the terminal device allocates remaining transmission power $P_r$ firstly to signal 1 with the highest priority, for example, causing the transmission $P_{min}$ thereof to reach its maximum transmission power $P_{1\text{-}max}$; if there is still surplus of the remaining transmission power $P_r$, then the terminal device proceeds with allocation of transmission power for signal 2; if there is still surplus of the remaining transmission power $P_r$, after the transmission power $P_{min}$ of signal 2 reaches its maximum transmission power $P_{2\text{-}max}$, then the terminal device proceeds with allocation of transmission power for signal 3. When the remaining transmission power is consumed out during the process of allocation and not enough for continuous allocation, the operation may be stopped. The effective transmission power of the signal which is the last one to be allocated with transmission power may not be able to reach its maximum transmission power.

Implementation Manner 3

Optionally, the determining, by the terminal device, an effective transmission power of a plurality of uplink signals includes: determining by the terminal device, if a sum of expected transmission powers of the plurality of uplink signals exceeds a maximum transmission power supported by the terminal device, the expected transmission power of each uplink signal among the plurality of uplink signals being reduced based on a ratio of the maximum transmission power to the sum of expected transmission powers of the plurality of uplink signals, as the effective transmission power of the each uplink signal.

Specifically, when the sum of expected transmission powers of the plurality of uplink signals exceeds the maximum transmission power supported by the terminal device, the terminal device may reduce the expected transmission power of each uplink signal among the plurality of uplink signals according to a certain ratio and, thus, determine the expected transmission power after being reduced as the effective transmission power of the uplink signal. Optionally, the ratio may be determined according to the maximum transmission power supported by the terminal device and the sum of expected transmission powers of the plurality of uplink signals.

For example, assuming that the maximum transmission power supported by the terminal device is $P_{max}$, the number of the plurality of uplink signals to be transmitted is N, and the expected transmission power of the i-th uplink signal among the plurality of uplink signals, which is derived according to a conventional procedure of uplink power control, is $P_i$, then the sum of expected transmission powers of the plurality of uplink signals is $P_a = \Sigma_{i=1}^{N} P_i$, and the terminal device may reduce the effective transmission power of the i-th uplink signal to $P_i \times (P_{max}/P_a)$.

Implementation Manner 4

Optionally, the determining, by the terminal device, an effective transmission power of a plurality of uplink signals includes: receiving, by the terminal device, indication information sent by a network device, the indication information indicating a power control parameter corresponding to the plurality of uplink signals; and determining, by the terminal device, the effective transmission power of the plurality of uplink signals according to the power control parameter corresponding to the plurality of uplink signals.

The power control parameter may include, for example, an open loop power control parameter, a closed loop power control parameter, a parameter related to path loss, or the like. The terminal device may determine the effective transmission power for each uplink signal based on these pre-configured power control parameters. For example, terminal device determines the effective transmission power for each uplink signal according to the power control parameters through a conventional procedure of uplink power control. Optionally, the indication information may be SRS Resource Indication (SRI), and the network device may indicate the power control parameter to the terminal device by using SRI, so that the terminal device can determine, according to the power control parameters, the effective transmission power of the plurality of uplink signals.

After determining the effective transmit power of the plurality of uplink signals, the terminal device may transmit the plurality of uplink signals simultaneously in a same frequency domain resource set according to the effective transmission power of the plurality of uplink signals.

Optionally, in step 220, the transmitting, by the terminal device, the plurality of uplink signals simultaneously in a same frequency domain resource set according to the effective transmission power of the plurality of uplink signals includes: transmitting, by the terminal device, the plurality of uplink signals simultaneously on different frequency domain resource in the same frequency domain resource set according to the effective transmission power of the plurality of uplink signals.

Optionally, in step 220, the transmitting, by the terminal device, the plurality of uplink signals simultaneously in a same frequency domain resource set according to the effective transmission power of the plurality of uplink signals includes: transmitting, by the terminal device, the plurality of uplink signals simultaneously in the same frequency domain resource set through different antenna panels according to the effective transmission power of the plurality of uplink signals.

Optionally, in step 220, the transmitting, by the terminal device, the plurality of uplink signals simultaneously in a same frequency domain resource set according to the effective transmission power of the plurality of uplink signals includes: transmitting, by the terminal device, the plurality of uplink signals simultaneously in the same frequency domain resource set through different beams according to the effective transmission power of the plurality of uplink signals.

Two transmission beams used by any two of the plurality of uplink signals that are simultaneously transmitted may be beams generated by a same antenna panel or may be beams generated by different antenna panels, which are not limited herein.

Therefore, the terminal device determines, according to a certain manner of power distribution, the effective transmission power respectively for the plurality of uplink signals to be transmitted simultaneously in the same frequency domain resource set and, thus, transmit the plurality of uplink signals simultaneously in the same frequency domain resource set according to the effective transmission power of the plurality of uplink signals. In this way, even if a transmission power of the terminal device is limited, the terminal device may be still able to re-determine, according to the manner of power distribution described in embodiments of the disclosure, the effective transmission power respectively for the plurality of uplink signals to be transmitted and, thus, transmit the plurality of uplink signals simultaneously in the same frequency domain resource.

It should be understood that, in the various embodiments of the disclosure, the sequence numbers of the foregoing processes do not indicate the order of execution order, and the execution order of each process should be determined by its function and internal logic, and should not be construed as any limitation to the implementation process of embodiments of the disclosure.

Figure 3:
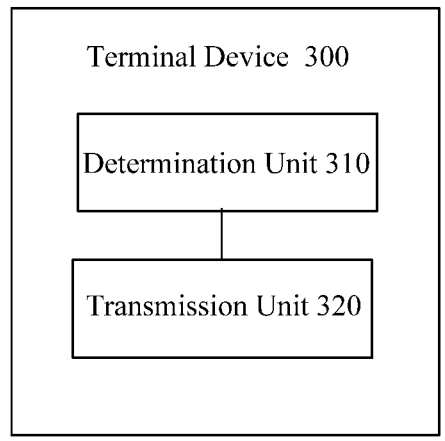
FIG. 3 is a block diagram illustrating a terminal device according to an embodiment of the disclosure.

FIG. 3 is a block diagram illustrating a terminal device 300 according to an embodiment of the disclosure. As shown in FIG. 3, the terminal device includes a determination unit 310 and a transmission unit 320.

The determination unit 310 is configured to determine an effective transmission power of a plurality of uplink signals.

The transmission unit 320 is configured to transmit the plurality of uplink signals simultaneously in a same frequency domain resource set according to the effective transmission power of the plurality of uplink signals.

Therefore, the terminal device determines, according to a certain manner of power distribution, the effective transmission power respectively for the plurality of uplink signals to be transmitted simultaneously in the same frequency domain resource set and, thus, transmit the plurality of uplink signals simultaneously in the same frequency domain resource set according to the effective transmission power of the plurality of uplink signals. In this way, even if a transmission power of the terminal device is limited, the terminal device may be still able to re-determine, according to the manner of power distribution described in embodiments of the disclosure, the effective transmission power respectively for the plurality of uplink signals to be transmitted and, thus, transmit the plurality of uplink signals simultaneously in the same frequency domain resource.

Optionally, the plurality of uplink signals include uplink data or an uplink reference signal.

Optionally, the plurality of uplink signals are uplink signals scheduled by the same DCI, or uplink signals respectively scheduled by different DCIs.

Optionally, the same frequency domain resource set includes: a same carrier, a same bandwidth part, a same sub-band, or a same set of PRB.

Optionally, the determination unit 310 is specifically configured to: determine the effective transmission power of the plurality of uplink signals according to a number of the plurality of uplink signals.

Optionally, the determination unit 310 is specifically configured to: determine a maximum supported transmission power of each uplink signal among the plurality of uplink signals according to the number of the plurality of uplink signals; and determine the effective transmission power of the each uplink signal based on the maximum supported transmission power of the each uplink signal.

Optionally, the determination unit 310 is specifically configured to: determine an expected transmission power of the each uplink signal among the plurality of uplink signals being reduced based on a ratio corresponding to the number of the plurality of uplink signals, as the effective transmission power of the each uplink signal.

Optionally, the determination unit 310 is specifically configured to: determine the effective transmission power of the plurality of uplink signals according to priority information of the plurality of uplink signals.

Optionally, the determination unit 310 is further configured to: determine the priority information of the plurality of uplink signals according to at least one of following information: a signal type of the plurality of uplink signals, a control signaling used for scheduling the plurality of uplink signals, a type of information carried by the plurality of uplink signals, and an order by which the plurality of uplink signals are scheduled.

Optionally, the terminal device further includes a receiving unit, the determination unit 310 is specifically configured to: receive, through the receiving unit, a plurality of DCIs used for scheduling the plurality of uplink signals, the plurality of DCIs carrying the priority information of the plurality of uplink signals; or receive, through the receiving unit, the plurality of DCIs, and determine the priority information of the plurality of uplink signals according to information of the MCS carried in the plurality of DCIs.

Optionally, the determination unit 310 is specifically configured to: allocate respective minimum transmission powers for the plurality of uplink signals; and allocate, according to the priority information of the plurality of uplink signals, remaining transmission power in a maximum supportable transmission power excluding the minimum transmission powers of the plurality of uplink signals to at least part of the plurality of uplink signals.

Optionally, the priority information of the plurality of uplink signals is configured by a network device in advance for the plurality of uplink signals.

Optionally, the determination unit 310 is specifically configured to: determine, if a sum of expected transmission powers of the plurality of uplink signals exceeds a maximum transmission power supported by the terminal device, the expected transmission power of each uplink signal among the plurality of uplink signals being reduced based on a ratio of the maximum transmission power to the sum of expected transmission powers of the plurality of uplink signals, as the effective transmission power of the each uplink signal.

Optionally, the terminal device further includes a receiving unit, the determination unit 310 is specifically configured to: receive, through the receiving unit, indication information sent by a network device, the indication information indicating a power control parameter corresponding to the plurality of uplink signals; and determine the effective transmission power of the plurality of uplink signals according to the power control parameter corresponding to the plurality of uplink signals.

Optionally, the transmission unit 320 is specifically configured to: transmit the plurality of uplink signals simultaneously on different frequency domain resource in the same frequency domain resource set according to the effective transmission power of the plurality of uplink signals.

Optionally, the transmission unit 320 is specifically configured to: transmit the plurality of uplink signals simultaneously in the same frequency domain resource set through different antenna panels according to the effective transmission power of the plurality of uplink signals.

Optionally, the transmission unit 320 is specifically configured to: transmit the plurality of uplink signals simultaneously in the same frequency domain resource set through different beams according to the effective transmission power of the plurality of uplink signals.

Figure 4:
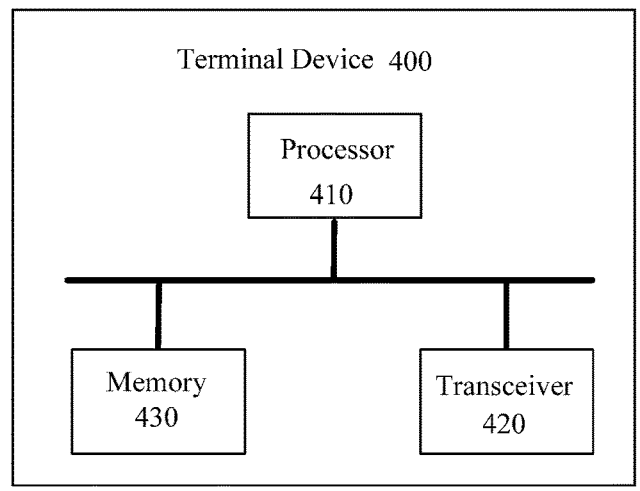
FIG. 4 is a schematic structural diagram illustrating a terminal device according to an embodiment of the disclosure.

FIG. 4 is a schematic structural diagram illustrating a terminal device 400 according to an embodiment of the disclosure. As shown in FIG. 4, the terminal device 400 includes a processor 410, a transceiver 420 and a memory 430. The processor 410, the transceiver 420, and the memory 430 communicate with each other through an internal connection path. The memory 430 is configured to store instructions, and the processor 410 is configured to execute instructions stored by the memory 430 so as to control the transceiver 420 to receive or transmit signals.

The processor 410 is configured to determine an effective transmission power of a plurality of uplink signals.

The transceiver 420 is configured to transmit the plurality of uplink signals simultaneously in a same frequency domain resource set according to the effective transmission power of the plurality of uplink signals.

Therefore, the terminal device determines, according to a certain manner of power distribution, the effective transmission power respectively for the plurality of uplink signals to be transmitted simultaneously in the same frequency domain resource set and, thus, transmit the plurality of uplink signals simultaneously in the same frequency domain resource set according to the effective transmission power of the plurality of uplink signals. In this way, even if a transmission power of the terminal device is limited, the terminal device may be still able to re-determine, according to the manner of power distribution described in embodiments of the disclosure, the effective transmission power respectively for the plurality of uplink signals to be transmitted and, thus, transmit the plurality of uplink signals simultaneously in the same frequency domain resource.

Optionally, the plurality of uplink signals include uplink data or an uplink reference signal.

Optionally, the plurality of uplink signals are uplink signals scheduled by the same DCI, or uplink signals respectively scheduled by different DCIs.

Optionally, the same frequency domain resource set includes: a same carrier, a same bandwidth part, a same sub-band, or a same set of PRB.

Optionally, the processor 410 is specifically configured to: determine the effective transmission power of the plurality of uplink signals according to a number of the plurality of uplink signals.

Optionally, the processor 410 is specifically configured to: determine a maximum supported transmission power of each uplink signal among the plurality of uplink signals according to the number of the plurality of uplink signals; and determine the effective transmission power of the each uplink signal based on the maximum supported transmission power of the each uplink signal.

Optionally, the processor 410 is specifically configured to: determine an expected transmission power of the each uplink signal among the plurality of uplink signals being reduced based on a ratio corresponding to the number of the plurality of uplink signals, as the effective transmission power of the each uplink signal.

Optionally, the processor 410 is specifically configured to: determine the effective transmission power of the plurality of uplink signals according to priority information of the plurality of uplink signals.

Optionally, the processor 410 is further configured to: determine the priority information of the plurality of uplink signals according to at least one of following information: a signal type of the plurality of uplink signals, a control signaling used for scheduling the plurality of uplink signals, a type of information carried by the plurality of uplink signals, and an order by which the plurality of uplink signals are scheduled.

Optionally, the processor 410 is specifically configured to: receive, through the transceiver 420, a plurality of DCIs used for scheduling the plurality of uplink signals, the plurality of DCIs carrying the priority information of the plurality of uplink signals; or receive, through the transceiver 420, the plurality of DCIs, and determine the priority information of the plurality of uplink signals according to information of the MCS carried in the plurality of DCIs.

Optionally, the processor 410 is specifically configured to: allocate respective minimum transmission powers for the plurality of uplink signals; and allocate, according to the priority information of the plurality of uplink signals, remaining transmission power in a maximum supportable transmission power excluding the minimum transmission powers of the plurality of uplink signals to at least part of the plurality of uplink signals.

Optionally, the priority information of the plurality of uplink signals is configured by a network device in advance for the plurality of uplink signals.

Optionally, the processor 410 is specifically configured to: determine, if a sum of expected transmission powers of the plurality of uplink signals exceeds a maximum transmission power supported by the terminal device, the expected transmission power of each uplink signal among the plurality of uplink signals being reduced based on a ratio of the maximum transmission power to the sum of expected transmission powers of the plurality of uplink signals, as the effective transmission power of the each uplink signal.

Optionally, the processor 410 is specifically configured to: receive, through the transceiver 420, indication information sent by a network device, the indication information indicating a power control parameter corresponding to the plurality of uplink signals; and determine the effective transmission power of the plurality of uplink signals according to the power control parameter corresponding to the plurality of uplink signals.

Optionally, the transceiver 420 is specifically configured to: transmit the plurality of uplink signals simultaneously on different frequency domain resource in the same frequency domain resource set according to the effective transmission power of the plurality of uplink signals.

Optionally, the transceiver 420 is specifically configured to: transmit the plurality of uplink signals simultaneously in the same frequency domain resource set through different antenna panels according to the effective transmission power of the plurality of uplink signals.

Optionally, the transceiver 420 is specifically configured to: transmit the plurality of uplink signals simultaneously in the same frequency domain resource set through different beams according to the effective transmission power of the plurality of uplink signals.

It should be understood that, in the embodiments of the disclosure, the processor 410 may be a Central Processing Unit (CPU), and the processor 410 may also be another general purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, or the like. The general purpose processor may be a microprocessor, the processor may be any conventional processor or the like.

The memory 430 may include read only memory and random access memory and provides instructions and data to the processor 410. A portion of the memory 430 may also include a non-volatile random access memory.

In an implementation process, each step of the foregoing method may be completed by an integrated logic circuit of hardware in the processor 410 or an instruction in a form of software. The steps in the method disclosed in the embodiments of the disclosure may be directly implemented by a hardware processor, or may be performed by a combination of hardware in the processor 410 and software modules. The software modules may be located in a conventional storage medium such as random access memory, flash memory, read only memory, programmable read only memory or electrically erasable programmable memory, registers, and the like. The storage medium is located in the memory 430, and the processor 410 reads the information in the memory 430 and completes the steps of the above method in combination with its hardware. To avoid repetition, it will not be described in detail here.

The terminal device 400 according to the embodiments of the disclosure may correspond to the terminal device for performing the method 200 in the foregoing method embodiments, as well as the terminal device 300 according to the embodiments of the disclosure, and each unit or module in the terminal device 400 is used for performing the operations or processes performed by the terminal device in the above method 200. In order to avoid redundancy, detailed description thereof will be omitted.

Figure 5:
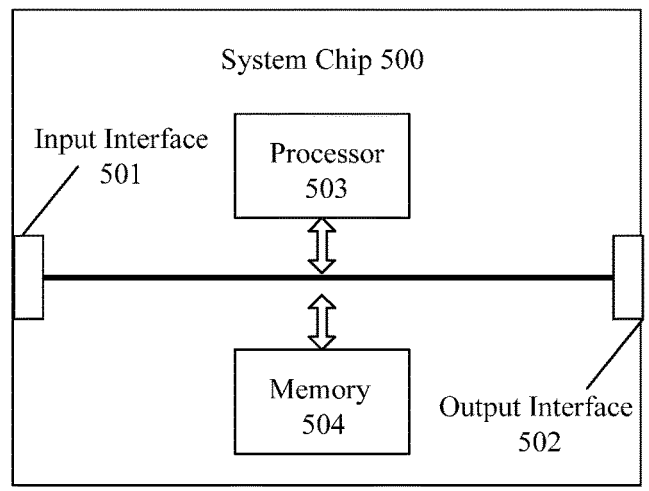
FIG. 5 is a schematic structural diagram illustrating a system chip according to an embodiment of the disclosure.

FIG. 5 is a schematic structural diagram illustrating a system chip according to an embodiment of the disclosure. The system chip 500 as shown in FIG. 5 includes an input interface 501, an output interface 502, at least one processor 503, and a memory 504. The input interface 501, the output interface 502, the processor 503, and the memory 504 are interconnected by an internal connection path. The processor 503 is configured to execute codes in the memory 504.

Optionally, when the codes are executed, the processor 503 can implement the method 200 performed by the terminal device in the method embodiments. For the sake of brevity, it will not be repeated here.

Persons of ordinary skill in the art may realize that it is possible to implement, by electronic hardware or a combination of computer software and electronic hardware, steps of units and methods in various examples as described in the embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the embodiments of the present disclosure.

Persons skilled in the art may clearly understand that for a convenient and concise description, a concrete work process of systems, apparatuses and units described above may refer to a corresponding process of the foregoing method embodiments, which is not repeated anymore herein.

From several embodiments provided in the application, it should be understood that the disclosed systems, apparatuses and methods may be implemented by means of other manners. For example, the apparatus embodiments described above are merely exemplary. For example, a unit partition is merely a logic functional partition. In actual implementation, additional manners of partitioning may be available. For another example, multiple units or components may be combined or integrated into another system, or some features may be ignored or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, i.e., either located at one place or distributed on a plurality of network units. Units may be selected in part or in whole according to actual needs to implement the objectives of the embodiments of the present disclosure.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solution of the embodiments of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of steps of the method as recited in the embodiments of the present disclosure. The aforementioned storage medium includes: a USB flash disk, a mobile hard disk, a read only memory (ROM), a random access memory (RAM), a magnetic disk or an optical disk and other media capable of storing program codes.

The abovementioned embodiments are merely specific embodiments of the present disclosure, but the protection scope of the embodiments of the present disclosure is not limited thereto. Any variation or substitution easily conceivable to a person of ordinary skills in the art within the technical scope disclosed in the present disclosure shall fall into the protection scope of the embodiments of the present disclosure. Therefore, the protection scope of the embodiments of the present disclosure shall be subject to that of the claims.

What is claimed is:

1. A signal transmission method, comprising:
   determining, by a terminal device, an effective transmission power of a plurality of uplink signals; and
   transmitting, by the terminal device, the plurality of uplink signals simultaneously in a same frequency domain resource set according to the effective transmission power of the plurality of uplink signals;
   wherein the determining, by the terminal device, an effective transmission power of a plurality of uplink signals comprises:
   determining, by the terminal device, a maximum supported transmission power of each uplink signal among the plurality of uplink signals according to the number of the plurality of uplink signals; and determining, by the terminal device, the effective transmission power of the each uplink signal based on the maximum supported transmission power of the each uplink signal; or
   determining, by the terminal device, an expected transmission power of the each uplink signal among the plurality of uplink signals being reduced based on a ratio corresponding to the number of the plurality of uplink signals, as the effective transmission power of the each uplink signal; or
   determining by the terminal device, if a sum of expected transmission powers of the plurality of uplink signals exceeds a maximum transmission power supported by the terminal device, the expected transmission power of each uplink signal among the plurality of uplink signals being reduced based on a ratio of the maximum transmission power to the sum of expected transmission powers of the plurality of uplink signals, as the effective transmission power of the each uplink signal.

2. The method according to claim 1, wherein the plurality of uplink signals are uplink signals scheduled by same downlink control information (DCI), or uplink signals respectively scheduled by different DCIs.

3. The method according to claim 1, wherein the determining, by the terminal device, an effective transmission power of a plurality of uplink signals comprises:
   determining, by the terminal device, the effective transmission power of the plurality of uplink signals according to priority information of the plurality of uplink signals.

4. The method according to claim 3, wherein before the determining, by the terminal device, the effective transmission power of the plurality of uplink signals according to priority information of the plurality of uplink signals, the method further comprises:
   determining, by the terminal device, the priority information of the plurality of uplink signals according to at least one of following information: a signal type of the plurality of uplink signals, a control signaling used for scheduling the plurality of uplink signals, a type of information carried by the plurality of uplink signals, and an order by which the plurality of uplink signals are scheduled.

5. The method according to claim 3, wherein the determining, by the terminal device, the effective transmission power of the plurality of uplink signals according to priority information of the plurality of uplink signals comprises:
   allocating, by the terminal device, respective minimum transmission powers for the plurality of uplink signals; and
   allocating, by the terminal device according to the priority information of the plurality of uplink signals, remaining transmission power in a maximum supportable transmission power excluding the minimum transmission powers of the plurality of uplink signals to at least part of the plurality of uplink signals.

6. The method according to claim 1, wherein the transmitting, by the terminal device, the plurality of uplink signals simultaneously in a same frequency domain resource set according to the effective transmission power of the plurality of uplink signals comprises:
   transmitting, by the terminal device, the plurality of uplink signals simultaneously in the same frequency domain resource set through different antenna panels according to the effective transmission power of the plurality of uplink signals.

7. A terminal device, comprising:
a processor configured to determine an effective transmission power of a plurality of uplink signals; and
a transceiver configured to transmit the plurality of uplink signals simultaneously in a same frequency domain resource set according to the effective transmission power of the plurality of uplink signals;
wherein the processor is further configured to:
determine a maximum supported transmission power of each uplink signal among the plurality of uplink signals according to the number of the plurality of uplink signals, and determine the effective transmission power of the each uplink signal based on the maximum supported transmission power of the each uplink signal; or
determine an expected transmission power of the each uplink signal among the plurality of uplink signals being reduced based on a ratio corresponding to the number of the plurality of uplink signals, as the effective transmission power of the each uplink signal; or
determine, if a sum of expected transmission powers of the plurality of uplink signals exceeds a maximum transmission power supported by the terminal device, the expected transmission power of each uplink signal among the plurality of uplink signals being reduced based on a ratio of the maximum transmission power to the sum of expected transmission powers of the plurality of uplink signals, as the effective transmission power of the each uplink signal.

8. The terminal device according to claim 7, wherein the plurality of uplink signals are uplink signals scheduled by same downlink control information (DCI), or uplink signals respectively scheduled by different DCIs.

9. The terminal device according to claim 7, wherein the processor is further configured to:
determine the effective transmission power of the plurality of uplink signals according to priority information of the plurality of uplink signals.

10. The terminal device according to claim 9, wherein the processor is further configured to:
determine the priority information of the plurality of uplink signals according to at least one of following information: a signal type of the plurality of uplink signals, a control signaling used for scheduling the plurality of uplink signals, a type of information carried by the plurality of uplink signals, and an order by which the plurality of uplink signals are scheduled.

11. The terminal device according to claim 9, wherein the processor is further configured to:
allocate respective minimum transmission powers for the plurality of uplink signals; and
allocate, according to the priority information of the plurality of uplink signals, remaining transmission power in a maximum supportable transmission power excluding the minimum transmission powers of the plurality of uplink signals to at least part of the plurality of uplink signals.

12. The terminal device according to claim 7, wherein the transceiver is further configured to:
transmit the plurality of uplink signals simultaneously in the same frequency domain resource set through different antenna panels according to the effective transmission power of the plurality of uplink signals.

* * * * *